M. F. TEN EYCK.
Thill-Coupling.

No. 212,333. Patented Feb. 18, 1879.

Attest:
H. D. Perrine
Am Long.

Inventor.
Maning F. Ten Eyck.
By H. J. Abbott
Atty.

UNITED STATES PATENT OFFICE.

MANING F. TEN EYCK, OF WARWICK, NEW YORK.

IMPROVEMENT IN THILL-COUPLINGS.

Specification forming part of Letters Patent No. 212,333, dated February 18, 1879; application filed December 7, 1878.

*To all whom it may concern:*

Be it known that I, MANING F. TEN EYCK, of Warwick, in the county of Orange and State of New York, have invented certain new and useful Improvements in Shaft-Clips; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1:
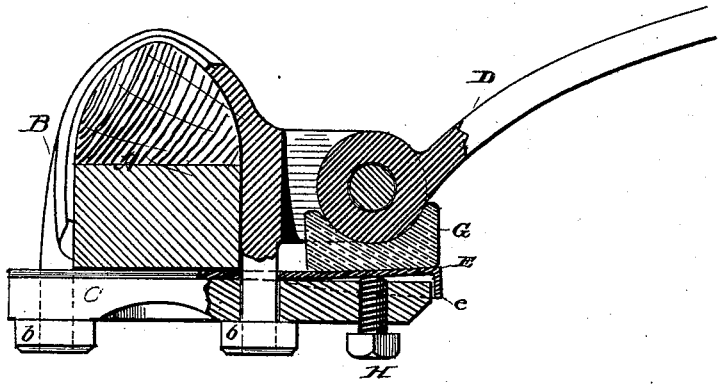
Figure 1:
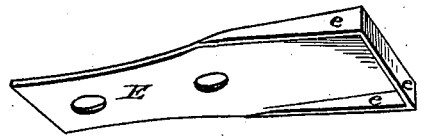
Figure 2:
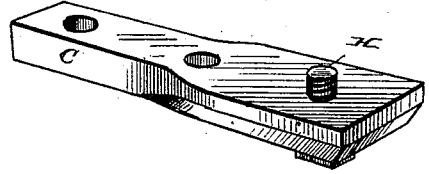

Figure 1 represents a sectional view of clip; Fig. 2, the yoke of the clip and the metal plate placed between it and the axle.

My invention relates to shaft-clips or thill-couplings; and it consists in a metal plate interposed between the clip-yoke and packing under the shaft-coupling, the plate extending under the axle between it and the yoke, thus forming a spring when the plate is raised by a screw passed through the yoke, and bearing against the plate, which elevation of the spring-plate tightens the coupling and prevents rattling; also, in providing the metal plate with flanges to prevent mud or dirt getting between the yoke and plate. The details are as follows:

A in the drawings represents the axle; B, the clip, fastened to axle A by means of nuts b, screwed onto ends of clip, and having the yoke C extended beyond the front of the axle and under the ears, to which the shaft-iron D is coupled.

Under the journaled end of the shaft-iron D is placed a packing, G, resting upon the plate E, which extends the whole length of the yoke, between it and the axle, thereby forming a spring.

The plate E has flanges e, which fit over the sides and one end of yoke C, thus excluding dirt or mud from between the yoke and plate. This plate is pushed upward by means of bolt H, which passes through the yoke, and bears against the bottom of the plate.

When the parts of the clip become loose by wear the plate is forced up by the screw or bolt H, and, bearing against the packing G, presses it against the journaled end of the shaft-iron, and thus tightens the several parts, preventing rattling.

Having thus described my invention, what I claim is—

1. The combination of the yoke C, packing G, and a plate interposed between yoke, packing, and axle, and susceptible of operation by a screw, H, substantially as set forth.

2. The plate E, interposed between yoke C and packing G, and provided with flanges fitting over yoke C, and susceptible of elevation by screw H, substantially as set forth.

In testimony that I claim the foregoing as my own I affix my signature in presence of two witnesses.

MANING F. TEN EYCK.

Witnesses:
JOHN J. BEATTIE,
THOMAS S. EDSALL.